(No Model.) 9 Sheets—Sheet 1.
H. S. MAXIM.
AUTOMATIC GAS OPERATED GUN.
No. 577,485. Patented Feb. 23, 1897.
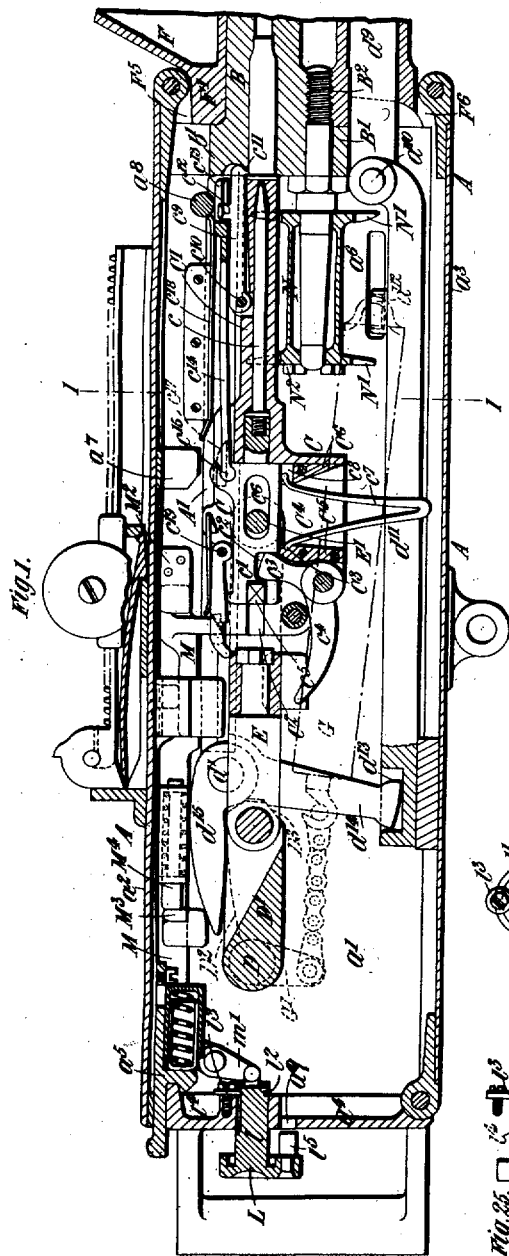
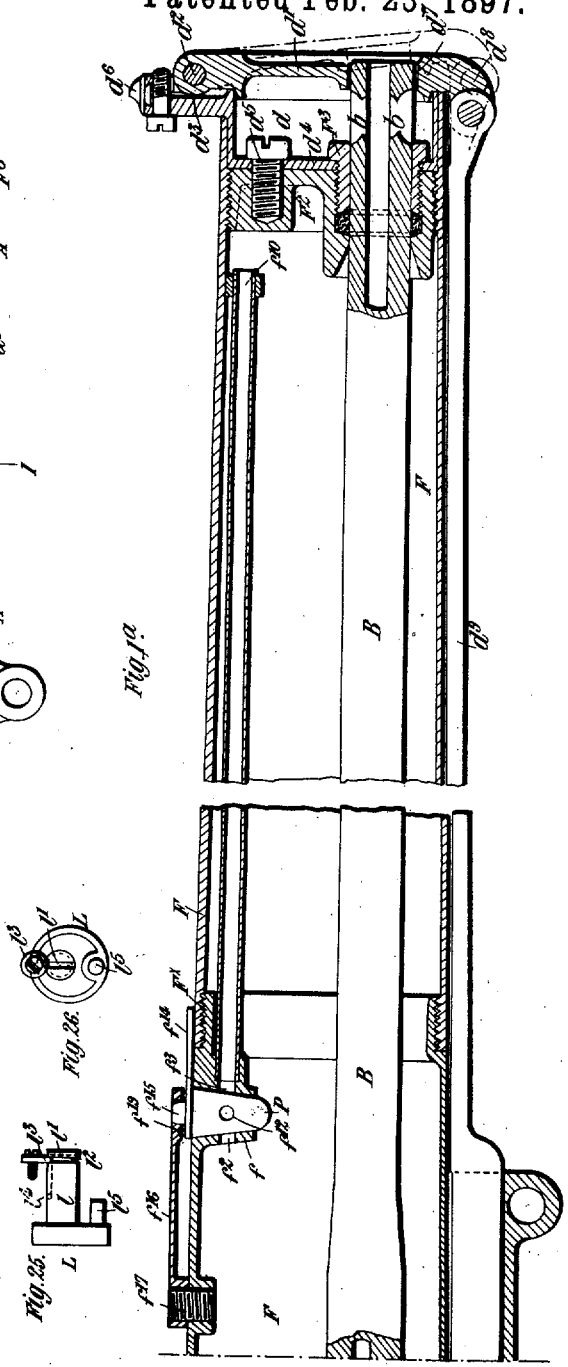
Witnesses:
Raphaël Netter
Edwin B. Hopkinson.
Hiram S. Maxim, Inventor
by James L. Norris, Atty.

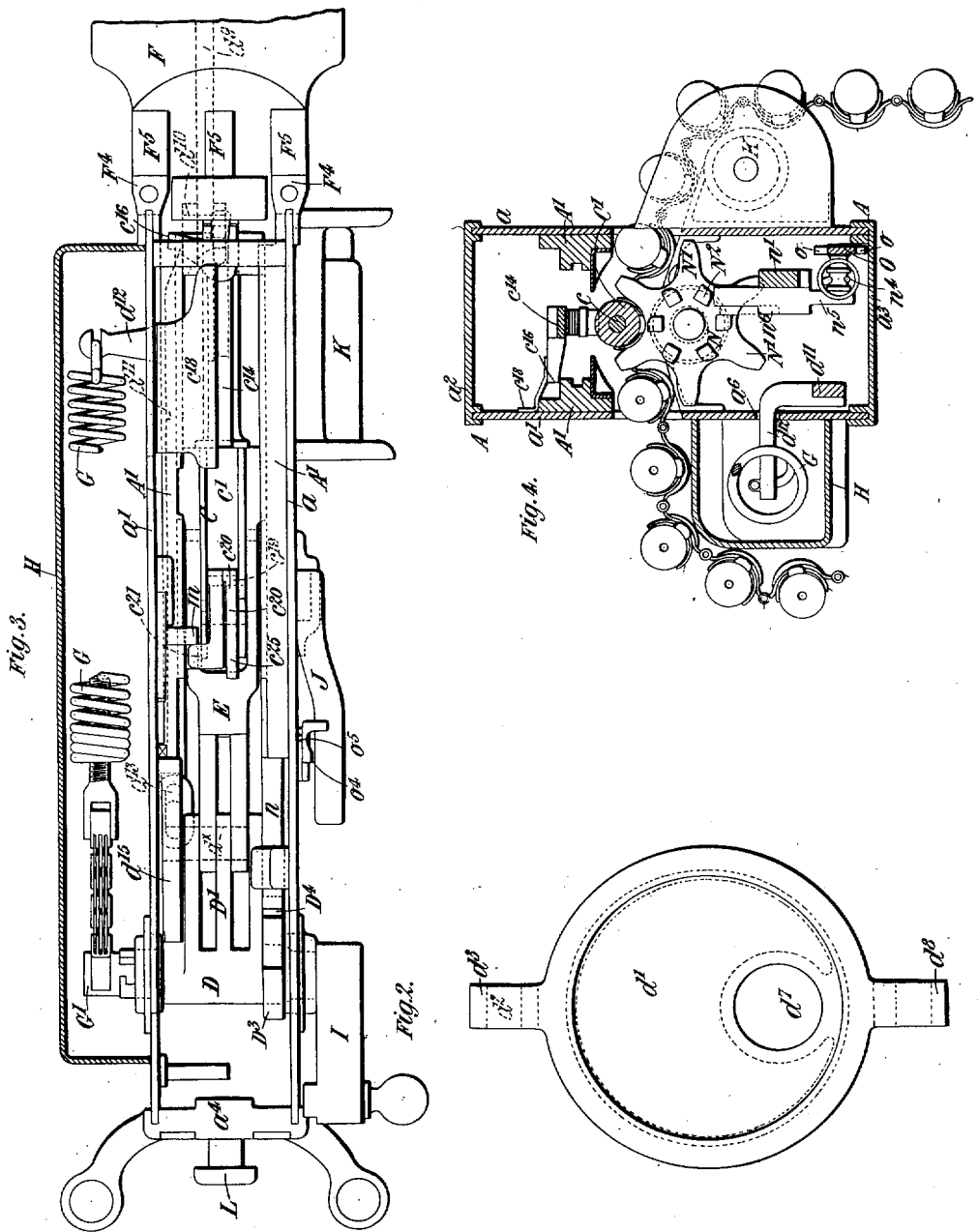

(No Model.) 9 Sheets—Sheet 3.
H. S. MAXIM.
AUTOMATIC GAS OPERATED GUN.
No. 577,485. Patented Feb. 23, 1897.
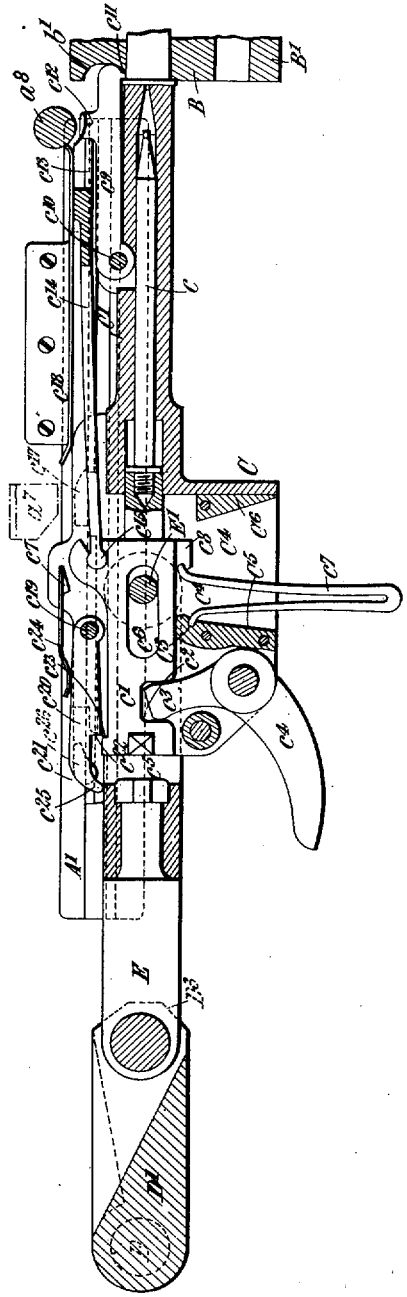
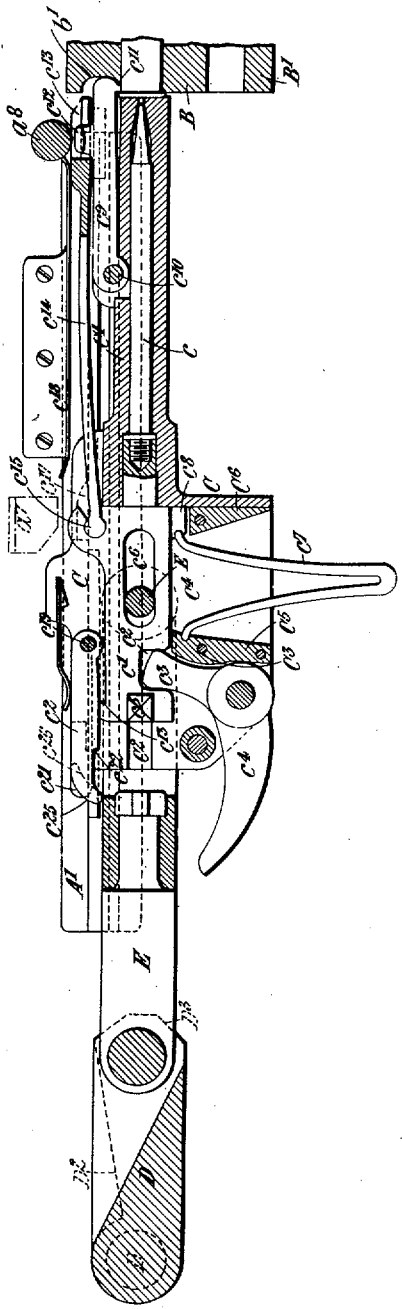
Witnesses:
Raphaël Netter
Edwin B. Hopkinson
Hiram S. Maxim, Inventor
James L. Norris
Att'y (No Model.) 9 Sheets—Sheet 4.
H. S. MAXIM.
AUTOMATIC GAS OPERATED GUN.
No. 577,485. Patented Feb. 23, 1897.
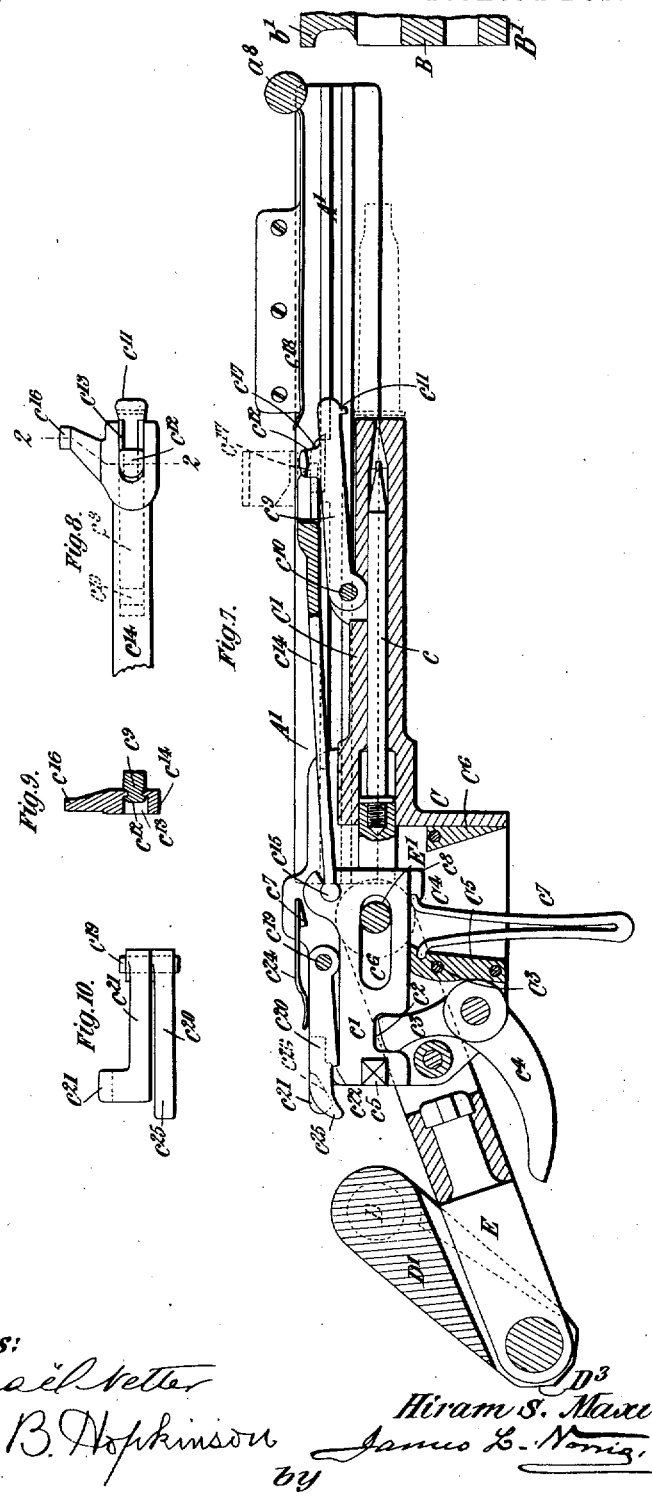
Witnesses:
Raphaël Netter
Edwin B. Hopkinson
Hiram S. Maxim, Inventor
by James L. Norris.
Att'y.

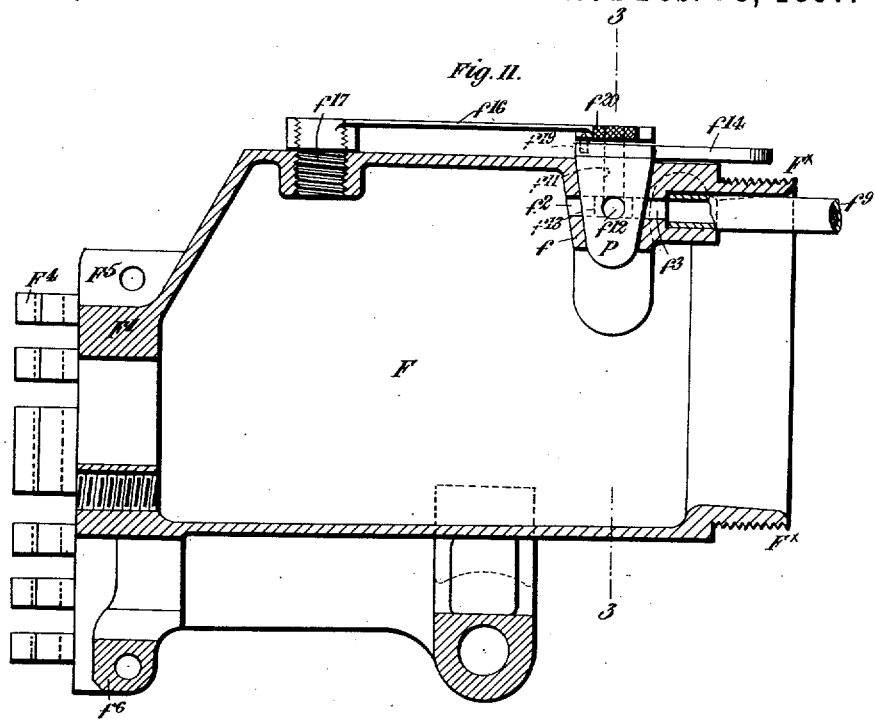
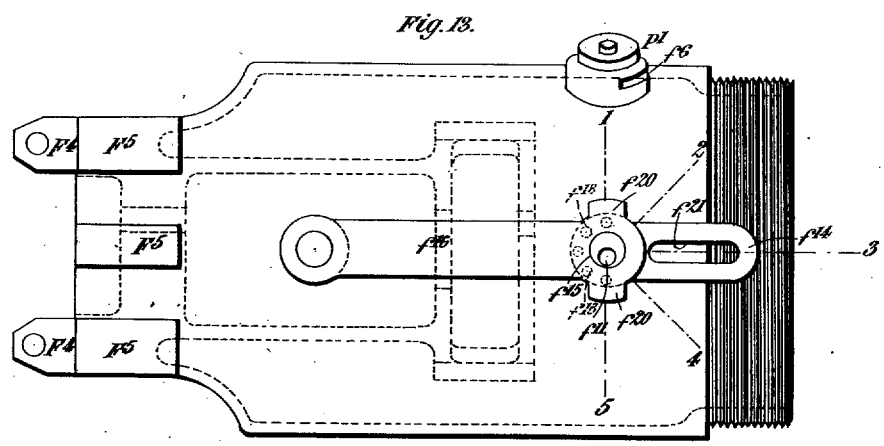

(No Model.) 9 Sheets—Sheet 6.
H. S. MAXIM.
AUTOMATIC GAS OPERATED GUN.
No. 577,485. Patented Feb. 23, 1897.
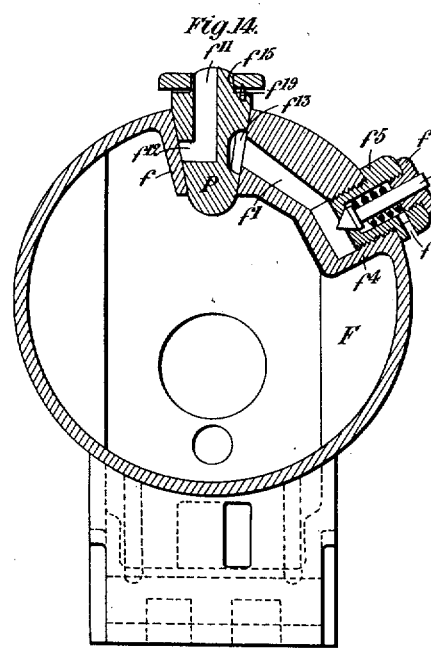
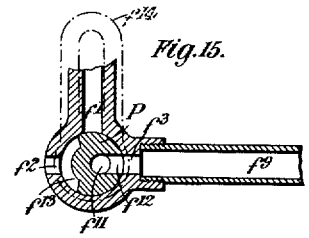
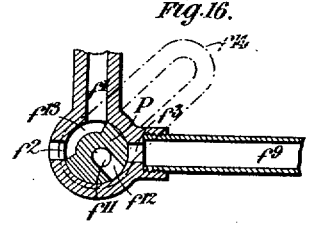
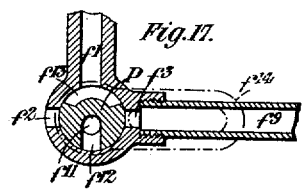
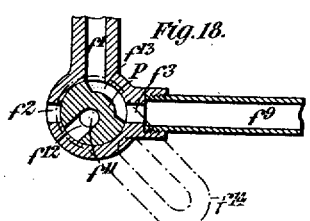
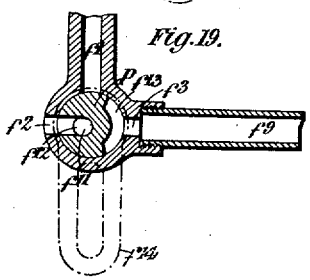
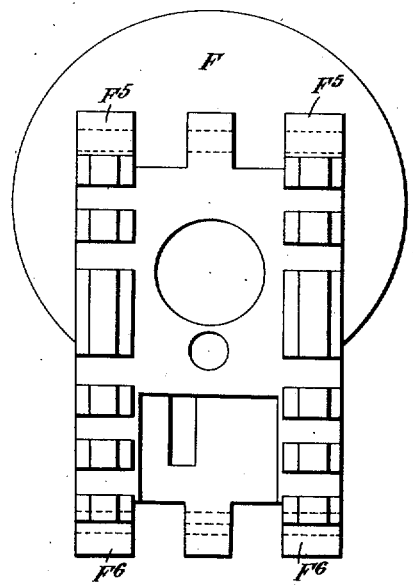
Witnesses:
Raphaël Netter
Edwin B. Hopkinson
Hiram S. Maxim, Inventor
by James L. Norris,
Att'y.

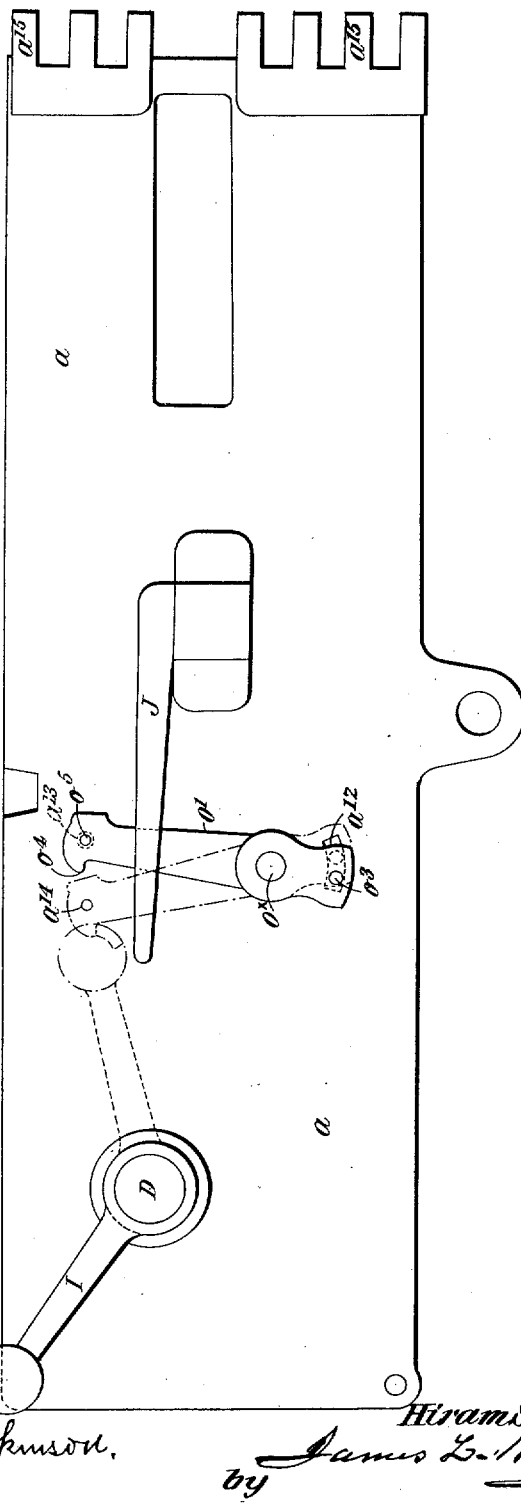

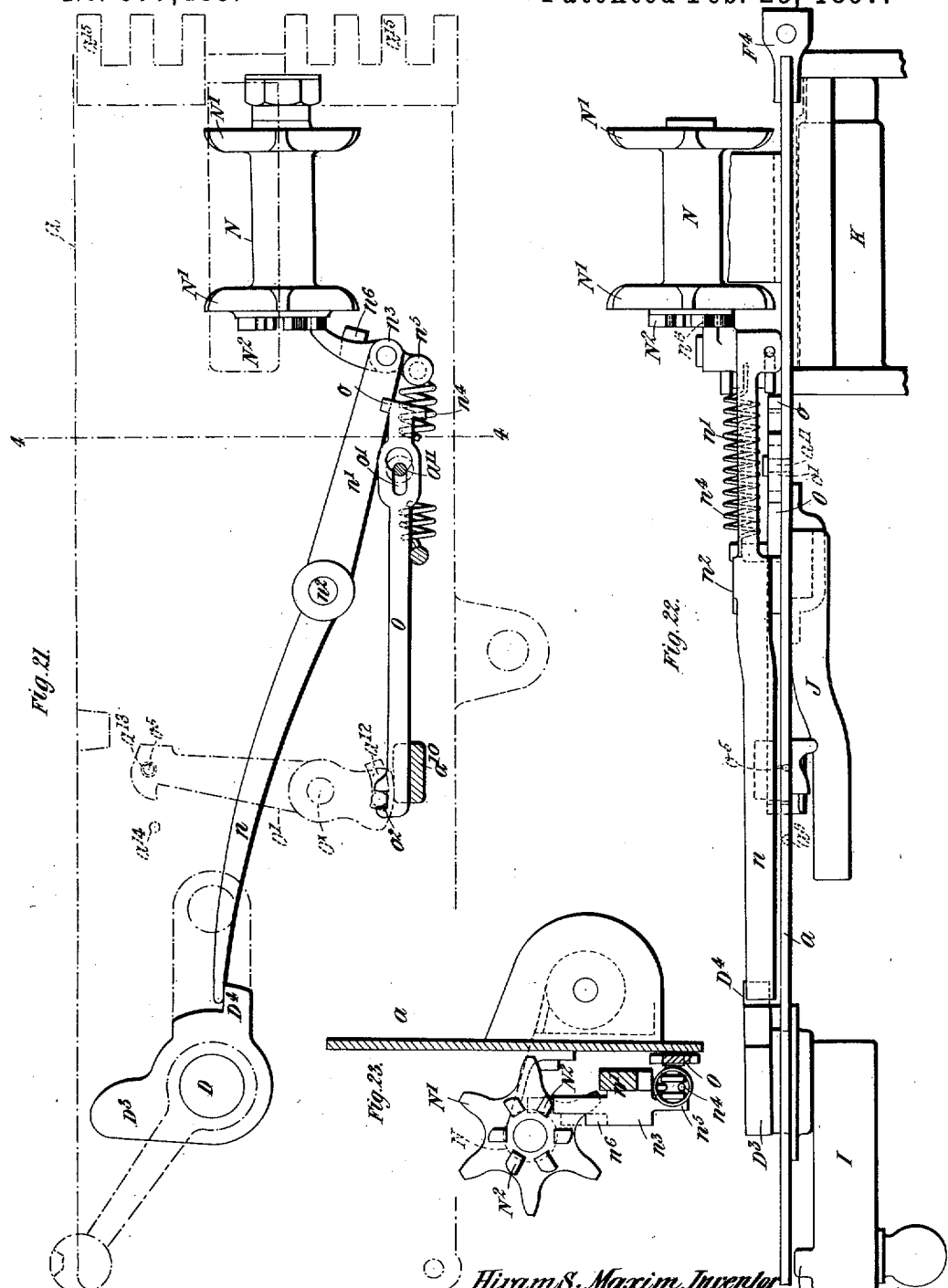

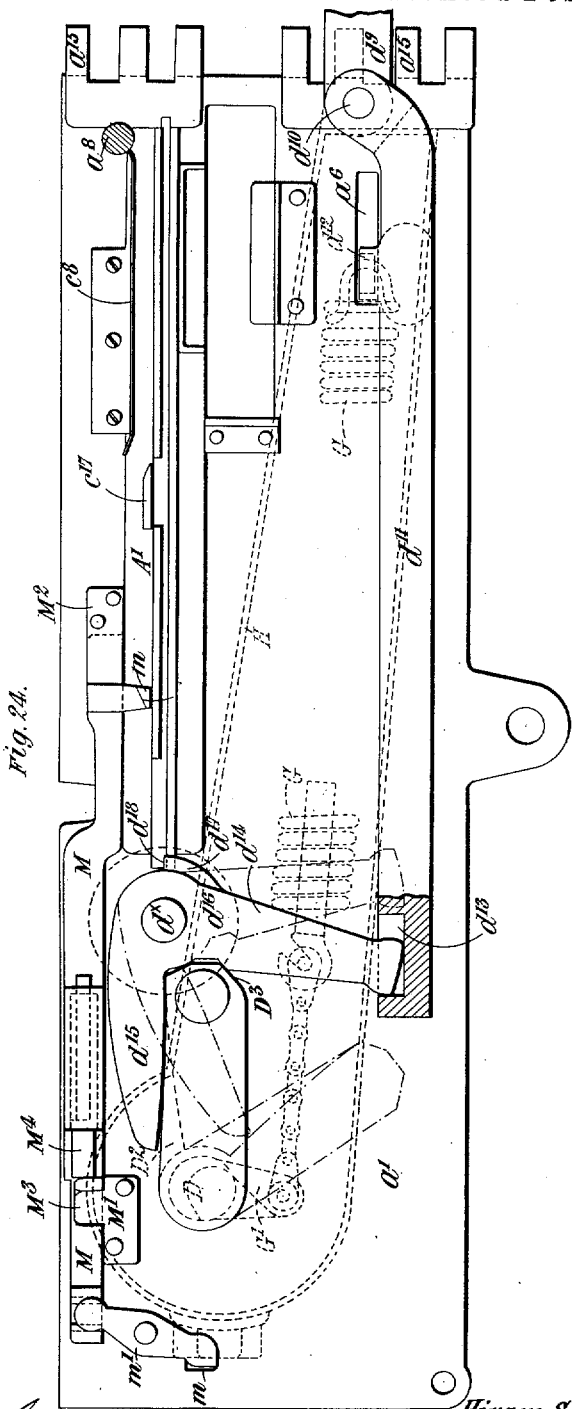

United States Patent Office.

HIRAM STEVENS MAXIM, OF LONDON, ENGLAND, ASSIGNOR TO THE MAXIM-NORDENFELT GUNS AND AMMUNITION COMPANY, LIMITED, OF SAME PLACE.

AUTOMATIC GAS-OPERATED GUN.

SPECIFICATION forming part of Letters Patent No. 577,485, dated February 23, 1897.

Application filed March 30, 1896. Serial No. 585,483. (No model.)

*To all whom it may concern:*

Be it known that I, HIRAM STEVENS MAXIM, mechanical engineer, a citizen of the United States, residing at 18 Queen's Gate Place, London, in the county of Middlesex, England, have invented certain new and useful Improvements in Automatic Guns, of which the following is a specification, reference being had to the accompanying drawings.

My invention relates to automatic or "Maxim" guns, and has chiefly for its object to generally improve the construction and arrangement of the various parts of these guns, so that the cost of their manufacture is diminished and their use with cartridges having light or thin cases rendered more advantageous.

In the improved gun which forms the subject of my present application I employ a non-recoiling barrel which extends into and is affixed to a jacket. This latter is divided by a transverse partition near its forward end into a water-chamber and a gas-chamber, and the requisite energy for working the breech mechanism is obtained by the gases of discharge escaping from the muzzle of the barrel or from lateral openings therein into the enlarged gas-chamber and actuating a movable plate or hinged flap forming the outer end of said chamber. The movement of this flap is transmitted through suitable connections to the breech mechanism, the operation of which is effected by such movement. I affix the breech end of the said barrel to the rear end of the water-jacket and secure the muzzle end by a suitable joint that will allow expansion and contraction of the barrel within the water-jacket.

By the employment of a non-recoiling barrel in the manner herein described I am enabled to dispense with the usual stuffing-boxes that are necessary with a recoiling barrel, and consequently I can allow steam under considerable pressure to collect within the water-jacket without causing leakage of water, which would not be practicable if ordinary stuffing-boxes and a recoiling barrel were employed. It is well known that when steam is blown off from the water-jacket at low pressure, say of about one atmosphere, it has such a large volume that a great deal of the water is carried over with it, and this objection can only be avoided by greatly increasing the pressure and thereby reducing the relative volume of the steam. I therefore provide the water-jacket with a device which will not allow the steam to escape when the pressure in the jacket is less than from five to ten atmospheres. This device prevents the escape of the water with the steam and also prevents any dripping from the gun when it is not l e ng fired.

The arrangement of the part termed the "feed-box" in the manner hereinafter specified allows the water-jacket to be extended to the rearward, so that a comparatively large body of water is provided for the barrel at the breech.

In the ordinary Maxim guns as generally constructed the cartridges are supplied to the gun by a belt which passes through or across the feed-box arranged above the breech end of the barrel, but according to my present invention instead of having the feed-box over the barrel it is placed to the rear of the barrel and in such a position that the cartridges as they are brought by the feed-belt into the loading position are driven directly from the belt into the cartridge-chamber by a plunger on the breech block or lock, and after they are fired their cases are drawn back into the same clip of the belt from which they were taken and are thereby carried away. The breech block or lock need not, therefore, be provided with any transversely-moving cartridge-carrier or other cartridge-transferring device on its forward end, such as that used in previously-constructed Maxim guns.

Other important features in my present invention relate to the manner in which the lock is constructed to permit of the ready withdrawal or insertion of the mainspring without the use of a special instrument; to the manner of holding the extractor down in place when the breech-block is closed and the gun fired; to a contrivance for enabling the blowing off of steam and water to be effected irrespective of the inclination of the gun; to the manner of holding together the plates that compose the casing inclosing the breech mechanism, and to the breech mechanism generally.

In order that my invention may be fully understood, I will proceed to fully describe it with reference to the accompanying drawings, in which—

Figures 1 and 1ª together represent a longitudinal section of the improved gun, the parts here shown being indicated in the position they occupy after firing. Fig. 2 is a face view of the movable end or flap of the gas-chamber. Fig. 3 is a sectional plan view of the rear portion of the gun shown in Fig. 1, the top plate or cover having been removed to exhibit the breech mechanism. Fig. 4 is a transverse section taken substantially on the line 1 1 of Fig. 1 and shows the cartridge-belt traveling through the gun. Figs. 5, 6, and 7 are longitudinal sections of the breech block or lock on a larger scale, Fig. 5 representing the breech closed and the striker "cocked," Fig. 6 the breech closed, but the striker "fired," and Fig. 7 the breech opened and the striker again cocked. Figs. 8 and 9 are respectively a plan view and cross-section showing a detail of the extracting mechanism. Fig. 10 is a plan view of the safety and firing sears. Figs. 11, 12, 13, and 14 are detail views showing, respectively, a longitudinal section, an end view, a plan, and a transverse section on the line 3 3, Fig. 11, of the breech-end portion of the water-jacket with the steam-escape device carried thereby. Figs. 15, 16, 17, 18, and 19 are horizontal sections showing diagrammatically the steam-escape device in various positions. Fig. 20 is a side elevation of the right-hand plate of the casing inclosing the breech mechanism and shows means for locking the crank-handle in a forward position when it is desired to remove the cartridge-belt from or adjust it in the gun. Fig. 21 is a similar view to that shown in the preceding figure, but shows the mechanism employed for feeding the cartridge-belt through the gun. This mechanism is situated on the inside of the plate, but for sake of clearness the outline of the plate itself is merely indicated by broken lines in this figure. Fig. 22 is a plan view of the mechanism illustrated in the foregoing figure, and Fig. 23 is a transverse section substantially on the line 4 4 of Fig. 21. Fig. 24 is a side elevation showing the inside of the left-hand plate of the casing and illustrates more particularly the mechanism employed for operating the crank-shaft. This view also shows the mechanism for releasing the firing-sear to fire the gun. Figs. 25 and 26 are detail views of the firing-button for actuating the firing mechanism, Fig. 25 being an elevation of the said button detached and Fig. 26 an end view thereof as seen from the inside of the gun.

In all the figures like letters of reference indicate similar parts.

A is the casing inclosing the breech mechanism, the said casing consisting of the side plates $a$ $a'$, the top and bottom plates $a^2$ $a^3$, and the end plate $a^4$.

$a^5$ is the spring-catch for retaining the top plate or cover closed.

B is the barrel.

C is the breech block or lock; A', the guide-plates in which the breech block or lock reciprocates; D, the crank-shaft; D', the crank; E, the connecting-rod coupling the crank to the lock; G, the spiral spring which acts on the fusee G' to return the crank to its horizontal position; H, the box or casing inclosing the spring; I, the crank-handle; J, the buffer-spring against which the crank-handle strikes in its forward movement; K, the roller over which the cartridge-belt passes as it enters the gun, and L the firing-button.

The barrel B is at its breech end formed with a flange B', which is connected by a screw B² to the rear portion F' of the water-jacket F. The muzzle end of the barrel passes through an opening provided in a disk or partition F², which is screwed into or otherwise connected to the water-jacket at a short distance from the muzzle end thereof. This opening is advantageously formed with a space to receive packing material, which can be firmly held around the barrel by a gland F³. Near the muzzle end of the barrel transverse openings $b$ $b$ are formed, through which the gases of discharge pass into a space or chamber $d$ immediately in front of the aforesaid partition F². The outer end of this chamber is movable and is preferably made in the form of a flap $d'$, which is hinged or pivoted at $d^2$ to a lug $d^3$, carried by a casing or steel lining $d^4$, that is situated within the space or chamber $d$ and connected by a screw $d^5$ to the said partition F². This casing or lining $d^4$ serves to prevent the bronze of the water-jacket from becoming overheated, and the lug $d^3$ is adapted to receive the fore sight $d^6$ of the gun.

The muzzle of the barrel B projects through an aperture $d^7$ in the hinged flap, the said aperture being made somewhat larger than the muzzle, so that the flap can freely turn about its hinge or pivot without meeting with any impediment from the barrel. Instead of arranging the barrel to extend completely through the gas-chamber, as shown in Fig. 1ª, the muzzle may terminate within the gas-chamber, and then the transverse openings $b$ would not be required. The aperture $d^7$ in the flap would, however, still be required to permit of the passage of the projectile. As the capacity of the cylinder and the area of the flap are both comparatively very large, the diameter of the said aperture $d^7$ can be correspondingly increased—that is to say, the aperture may be as large as the external diameter of the barrel, and yet sufficient energy be obtained from the gases to satisfactorily operate the flap and work the gun. A large aperture of this kind does not in any way interfere with the accuracy of fire. To the lower end $d^8$ of the flap is connected a rod $d^9$, which extends along the under side of the water-jacket, and at its opposite end is coupled by a pin $d^{10}$ to a bar $d^{11}$, adapted to slide longitudinally within the casing A of the gun. The side plate $a'$ of this casing is formed with a slot $a^6$, through which a lug $d^{12}$ on the bar $d^{11}$ projects and is connected on the exterior of the gun to the adjacent end of the spring G.

The rear end of the bar $d^{11}$ is recessed or slotted at $d^{13}$ for the reception of the end of the limb $d^{14}$, forming part of a bell-crank lever which is pivoted at $d^\times$ to the side plate $a'$ of the casing A. The other limb $d^{15}$ of this bell-crank lever is adapted to act upon the curved portion $D^2$ of the crank. It will thus be seen that when the flap $d'$ is turned into the dotted position indicated in Fig. 1ª the bar $d^{11}$ is shifted longitudinally and causes the bell-crank lever to turn the crank about its axis into the position represented by the dotted lines in Fig. 24 and thereby opens the breech. When this movement takes place, the spiral spring G will be subjected to two stretching forces, one due to the forward movement of the bar $d^{11}$ and the other to the backward rotary movement of the fusee G', carried by the crank-shaft. Consequently the said spring in its reaction not only restores the crank to its horizontal position and closes the breech, but also returns the flap to its shut position. The end of the aforesaid curved portion $D^2$ of the crank is beveled at $D^3$, (see Fig. 24,) and the adjacent edge of the limb $d^{14}$ of the bell-crank lever is recessed at $d^{16}$ for the reception of the aforesaid beveled end of the crank. By these means, immediately the parts assume the position represented by the full lines in Fig. 24, the crank is firmly retained in its horizontal position, from which it cannot again move until the bar $d^{11}$ is again actuated by the flap. In other words, the bell-crank lever acts as a "dead-stop" and prevents any rebounding of the parts when the breech is closed by the action of the aforesaid spring G.

The aforesaid bell-crank lever is furnished with a projection $d^{17}$, which is so situated that it lies in front of an extension $d^{18}$ on the guide. The bell-crank lever is thus normally held in place on its fulcrum $d^\times$, but by turning the said bell-crank lever into a position to remove the said projection $d^{17}$ from in front of the extension $d^{18}$ it can be readily removed from its fulcrum.

By employing a hinged flap in the manner above stated the gun is not rendered unsightly or unsymmetrical in appearance, whereas in guns heretofore worked with apparatus such as a piston and cylinder situated near the muzzle an objectionable appearance has been imparted to the gun. Moreover, the rod connecting the piston with the breech mechanism had to be of great strength to prevent its being bent. With my present construction I am able to employ a simple rod which is always in tension. Consequently great stiffness is not necessary, and the gun can therefore be made much lighter.

In other automatic guns that have been operated by the gases of discharge the piston and cylinder have been of extremely small dimensions and the pressure of gas and the temperature have been very high. These conditions have necessitated comparatively good fits between the parts to prevent leakage, and incrustation and wearing of the parts have therefore had a very marked effect upon the working of the gun. By making the gas-chamber very large, as in my present invention, so that the said chamber will contain a considerable quantity of air, it is found that the parts do not have to fit tightly, that no perceptible incrustation takes place, and that the pressure and temperature are both comparatively low, so that the parts do not get overheated. As the outer walls of the said gas-chamber are formed by the continuation of the water-jacket the gas-chamber and parts connected therewith are kept cool by the same water that cools the water-jacket. Furthermore, in all guns wherein a piston and cylinder have been employed it has been necessary for the piston to move approximately coaxially with or parallel to the bore of the barrel; otherwise the aim would be disturbed. With my improved device little disturbance takes place, because at the time that the gas-pressure is acting on the parts the surface of the hinged flap is practically perpendicular to the axis of the barrel.

Another important advantage resulting from the use of the aforesaid hinged flap is that its comparatively large area enables plenty of air to enter the gas-chamber at each shot, and this air becoming heated by the gases of discharge that enter the said gas-chamber expands, so that the gun is therefore partly worked by hot air. Moreover, the said flap does not fail in its action and enables me to obtain with small cartridges any amount of power that may be required for working the gun.

The breech block or lock comprises a hollow body portion C, having at its front end a bolt or plunger C', through which the firing-pin or striker $c$ extends. The rear end of the striker is carried by a sliding block $c'$, which is notched at $c^2$ to receive the nose $c^3$ of the cocking-lever $c^4$. This sliding block $c'$ has lateral projections $c^5$, which enter and work in guide-grooves $C^2$, formed in the side plates of the lock-body. The said sliding block is also formed with a longitudinal slot $c^6$, through which extends a transverse pin E' for securing the connecting-rod E to the lock. $c^7$ is the mainspring, one end of which bears against a notched fixed piece $C^3$ on the lock-body and the other end against a notched projection $c^8$ on the sliding block of the striker. $C^4$ is an opening in the lock-body, and $C^5$ $C^6$ are inclined surfaces with which the opposite sides of this opening are provided, the said inclines being so arranged with respect to the before-mentioned notched projection $c^8$ that when the striker is in its forward position the said notched projection is located immediately at the upper extremity of the incline $C^6$. As the notch $C^3$ is also at the upper extremity of the incline $C^5$, I am enabled to readily insert the mainspring into the lock by merely thrusting it through the opening existing between the inclined surfaces, these surfaces acting as guides which force the ends of the mainspring toward each other and release them when they reach the upper ends of the inclined surfaces and permit them to enter the aforesaid notch $C^3$ and the notch in the projection $c^8$. The removal of the mainspring is equally simple by exerting a downward pull thereon. The use of a special instrument for removing and replacing the mainspring is by these means therefore rendered unnecessary.

$c^9$ is the extractor, which is pivoted at $c^{10}$ to the upper part of the bolt or plunger $C'$. Its front end is curved and provided with a lip $c^{11}$, which is adapted to come between the head of the cartridge and the breech end of the barrel when the lock is in its closed position, Figs. 5 and 6, the said breech end of the barrel being recessed at $b'$ for permitting the extractor to assume such position. It will be observed that the barrel is not recessed to receive the head of the cartridge, but that the head rests against and projects beyond the flat surface of the breech end of the barrel. Near the front end of the extractor and on the upper edge thereof is a head or T piece $c^{12}$, which engages with a slot $c^{13}$, formed in the end of a resilient arm $c^{14}$. This arm is connected at its rear end $c^{15}$ to the sliding block of the striker, the connection being such that the arm is capable of slight pivotal movement. The manner of coupling the extractor to the resilient arm by the head or T piece $c^{12}$ and slot $c^{13}$ enables the said arm to shift longitudinally without interfering with the extractor and without becoming disengaged therefrom. Extending laterally from the slotted end of the resilient arm is an ear or lug $c^{16}$, which during the rearward movement of the lock is acted upon to raise the said arm and the extractor by a projection or cam-piece $c^{17}$, standing out from the left-hand guide-plate $A'$.

$c^{18}$ is a flexible guide attached to the side plate $a'$ of the gun, the said guide being so situated that it keeps the arm $c^{14}$ in its depressed position and the extractor in engagement with a cartridge until the aforesaid ear $c^{16}$ engages with and is raised by the said cam-piece $c^{17}$, that is to say, until the lock has completed or almost completed its rearward movement. When the arm $c^{14}$ is raised, the extractor is likewise lifted by its head or T piece $c^{12}$, and thus releases the cartridge. In order to prevent the arm $c^{14}$ from rising too high at this time, as it otherwise might do when its ear is out of engagement with the flexible guide $c^{18}$, I provide on the cover $a^2$ of the gun a downward projection $a^7$, which occupies a position just above the slotted end of the said arm when the latter is in its rearward position, Fig. 7.

$a^8$ is a pin extending transversely between the two side plates $a\ a'$, this pin being so situated that it acts as a stop to press down the extractor into engagement with the head of the cartridge as the latter is thrust into the cartridge-chamber by the bolt or plunger $C'$. When the gun is fired, the striker in its forward movement carries the slotted end of the flexible arm between the said pin $a^8$ and the extractor, and thereby acts as a wedge to firmly hold the extractor in engagement with the head of the cartridge during the initial rearward movement of the lock when it is in the act of withdrawing the empty cartridge-case from the barrel.

$c^{19}$ is a pin carried by the lock-body, and on this pin are loosely mounted the safety-sear $c^{20}$ and the firing-sear $c^{21}$. Each of these sears is provided with a shoulder $c^{22}$, which is capable of engagement with a corresponding shoulder $c^{23}$ on the rear end of the upper edge of the sliding block $c'$ of the striker. A spring $c^{24}$, carried by the lock-body, tends to keep these sears depressed. As a convenient manner of connecting this spring to the lock-body I provide a triangular slot $c^7$, into which a fin on the spring is adapted to enter. This fin is somewhat longer than the distance between the apex and base of the triangular slot, but is somewhat shorter than the hypotenuse, so that in the insertion of the fin into the slot the said fin is placed parallel to the said hypotenuse, and after its insertion is shifted in an upward direction, whereby its extremities bind against the apex and base of the triangular slot. The spring is thus firmly held in position and is assisted to retain such position by the pressure of the spring on the sears. The free end $c^{25}$ of the safety-sear $c^{20}$ is bent downward so that its extremity lies somewhat lower than the shoulder $c^{22}$. In other words, the relative position of these parts is such that when the side arms of the connecting-rod E assume their horizontal position, Fig. 5, in the closing of the breech they act upon the aforesaid bent end $c^{25}$ and raise the safety-sear high enough to bring its shoulder out of the path of the shoulder $c^{23}$ on the sliding block $c'$. The striker can then be released by lifting the firing-sear $c^{21}$. The lifting of this sear is effected by a sliding rod or bar M, which is provided with a cam-piece $m$, Fig. 24, that can be brought under an inclined shoulder $c^{26}$ on the firing-sear when the said bar is shifted rearwardly. This rearward movement of the bar is performed by pressing inwardly the firing-button L, whose inner end acts upon a pivoted lever $m'$, which at its upper end engages with the aforesaid bar M. $M'\ M^2$ are brackets in which this bar slides. One of them—viz., M'—is furnished with an ear $M^3$, against which the rear end of a rod $M^4$, carried by the bar M, bears by the action of a spiral spring surrounding the said rod. When the beforementioned firing-button L is released after having been pressed inward, this spring-controlled rod $M^4$ acts to return the sliding bar to its forward position and removes the cam-piece $m$ out of engagement with the firing-sear. The said firing-button is formed at the inner end of its stem $l$ with a V-shaped notch $l'$, (see Figs. 25 and 26,) with which a V-shaped projection $m^x$ on the lower end of the aforesaid pivoted lever $m'$ engages and prevents the button from being unintentionally turned. The said V-shaped notch will not, however, absolutely prevent the button from being turned if sufficient force be purposely exerted thereon. The said stem of the firing-button is likewise formed with a circumferential groove $l^2$ near the inner end thereof, and into this groove fits a disk or washer $l^3$, secured to the end plate $a^4$ of the gun. A longitudinal groove $l^4$ is also formed in the stem of the firing-button and extends rearwardly from the aforesaid circumferential groove $l^2$. This longitudinal groove is semicircular in cross-section and conforms to the curvature of the disk $l^3$. Therefore when the firing-button is turned into a position to bring the longitudinal groove $l^4$ in correspondence with the said disk $l^3$ the firing-button can be readily pushed in to discharge the gun; but if the button be turned out of this position, so that the disk $l^3$ no longer occupies a position in correspondence with the longitudinal groove $l^4$, then the circumferential groove will act as a safety device to prevent the inward movement of the firing-button. If desired, the button may also be furnished with a stud $l^5$, which is adapted to enter a hole $a^9$ in the end plate $a^4$ when turned into a proper position. Otherwise the said stud will strike against the plate $a^4$ when pushed inwardly and prevent the gun from being discharged.

The rearward movement or "cocking" of the striker is effected by the side arms of the connecting-rod E depressing the tail of the cocking-lever $c^4$ during their downward movement as the lock retires in opening the breech.

The aforesaid resilient arm $c^{14}$ does not affect the extractor during the cocking of the striker, the slotted end of the arm permitting the latter to slide independently of the extractor. As the breech block or lock retires far enough to bring the said arm into the position shown in Fig. 7 it raises the extractor, as there shown, and thus releases the cartridge-case after having drawn it into the empty clip of the cartridge-belt. This arm and the flexible guide $c^{18}$ also permit the extractor to have a certain amount of free vertical movement during the closing of the breech, so that in the event of a cartridge getting in front of the curved end of the extractor the lip $c^{11}$ thereon will be able to get in front of the head of the cartridge, either during its advance movement or after the latter is in the cartridge-chamber. It is only on the instant of firing and when the striker flies forward that the extractor becomes firmly held in engagement with the cartridge by the wedge-like action that takes place as the slotted end of the flexible arm passes beneath the transverse bar $a^8$.

Situated immediately below the bolt or plunger $C'$ of the lock is a feed-wheel N, having a series of teeth or cavities $N'$ on its periphery for engaging with the clips on the cartridge-belt to carry it through the gun during the movement of the feed-wheel. Between the uppermost of these circumferential teeth or cavities $N'$ the bolt or plunger on the lock reciprocates at each discharge, and during its backward movement withdraws an empty cartridge from the barrel and replaces the said empty cartridge in the same clip of the belt from which it was originally taken during the forward movement of the bolt or plunger. The said clips of the cartridge-belt are constructed in the manner hereinafter stated to permit of this operation, and the feed mechanism is so devised, as subsequently explained, that the said feed-wheel remains stationary during the pushing of the cartridge from the belt into the barrel and the withdrawal thereof after firing.

The feed-wheel receives an intermittent rotary movement from an arm $n\ n'$, Figs. 21 to 23, which is pivoted at $n^2$ to the inner face of the side plate $a$. The end $n$ of this arm is made somewhat flexible and the end $n'$ is provided with a pivoted pawl $n^3$. The said feed-wheel is formed with projections or teeth $N^2$, with which this pawl engages to actuate the feed-wheel. The tooth of the pawl is kept normally in engagement with the said projections or teeth $N^2$ by means of a spring $n^4$, one end of which is connected to a stud on the side plate $a$ and the other end to an extension $n^5$ on the pawl. The pawl is also formed with a shoulder $n^6$, which is so arranged that when the pawl rises in the act of turning the feed-wheel this shoulder comes between the projections or teeth $N^2$, as shown by the dotted lines in Fig. 23, thereby preventing the feed-wheel from turning beyond its proper distance and insuring that the next cartridge in the belt shall come truly in alinement with the cartridge-chamber and with the bolt or plunger on the lock, which latter has at this time fully retired to the rear.

To operate the arm $n\ n'$, the crank-shaft is furnished with two projections $D^3\ D^4$, and between these two projections the end $n$ of the arm lies, so as to be operated on by the projection $D^3$ as the crank rotates backwardly and the lock retires and by the projection $D^4$ as the crank rotates forwardly and the lock advances. The rearward movement of the lock is, however, such that the projection $D^3$ comes against and exerts tension on the end $n$ of the arm before the bolt or plunger of the lock has entirely left the feed-wheel. Consequently on the instant the said bolt or plunger leaves the feed-wheel the latter is immediately shifted to bring a fresh cartridge in the belt between the cartridge-chamber and the bolt or plunger. This tension on the arm continues until the end of the bolt or plunger has entered the feed-wheel. By these means elasticity of the parts is obtained and any sudden or jerky action of the bolt is avoided. As the said bolt or plunger enters the feed-wheel and the crank returns to its horizontal position the projection $D^4$ returns the arm $n\ n'$ to its original position ready to advance the feed-wheel another step at the next rearward movement of the lock. On account of the rapid action of the parts the feed-wheel does not have time to shift, but in slower-firing guns a pawl may be provided to prevent the wheel from shifting backward while the bolt is out of engagement with one of the peripheral cavities in the wheel.

Mounted on the aforesaid side plate $a$ is a sliding bar O, which is supported by a bracket $a^{10}$ at one end and by a pin $a^{11}$ at the other end. The bar is formed with a keyhole-slot $o'$ for the reception of the said pin $a^{11}$, the narrow portion of the slot acting as a guide and the wider portion serving to enable the bar to be readily removed from the pin and detached when desired. The said bar is formed at its front end with an incline $o$ and at its rear end with a jaw $o^2$, the said incline being adapted to come against the extension $n^5$ of the pawl when the bar O is moved inward and to thereby shift the tooth of the pawl out of engagement with the teeth or projections on the feed-wheel. In order to effect this movement of the bar O, a lever or catch O', Fig. 20, is pivoted at $O^\times$ on the outside of the plate $a$, this lever or catch having at its lower end a pin $o^3$, which projects through a curved slot $a^{12}$ in the said plate and engages with the aforesaid jaw $o^2$ on the bar O. The lever or catch O' has a hooked upper end $o^4$, which is capable of engaging with a projection $i$ on the crank-handle I when the latter is in its forward position and the said catch turned into the position represented by the dotted lines in Fig. 20. The catch then locks the crank-handle in its forward position, and thus acts as a safety contrivance for throwing the gun out of action. The said catch, by liberating the pawl from the feed-wheel, enables the latter to be turned in either direction and also permits the cartridge-belt to be readily withdrawn from the gun when all the cartridges have been fired. There is a pin $o^5$ projecting from the upper end of the catch, which is adapted to engage with one or other of two recesses $a^{13}\ a^{14}$ in the plate $a$, so that the said catch can be retained in either of its extreme positions.

The water-jacket F is formed in two portions, which are connected together by screw-threads $F^\times$. In the rear portion of the said water-jacket there is a transverse passage $f'$, which terminates at one end in a socket $f$, for the reception of a rotary tapered plug P, and at the other end in a socket $f^4$ for the reception of a valve P', Figs. 13 and 14. This valve may be of any desired construction, that illustrated in the drawings consisting of a hollow screw-plug $f^5$, having a segmental opening $f^6$ therein, which communicates with the atmosphere. Within the hollow screw-plug is a coned valve $f^7$, which is kept on its seat by a spring surrounding its spindle. The outer end of this spindle extends through a screw-cap $f^8$ on the hollow plug $f^5$. This valve should be such that it will not allow the steam to escape until the pressure within the water-jacket exceeds, say, five atmospheres. The aforesaid plug-socket $f$ is open at its lower end and communicates by lateral openings $f^2 f^3$, situated diametrically opposite each other, with the interior of the water-jacket. Connected to the opening $f^3$ is a tube $f^9$, whose outer end $f^{10}$ extends to a point in proximity to the muzzle end of the water-jacket. It will thus be seen that the opening $f^2$ is open to the water-jacket at the breech end thereof and the opening $f^3$ at the muzzle end thereof. This arrangement enables the steam to reach the plug P from either end of the water-jacket, so that when the muzzle of the gun is depressed and the open end of the tube $f^9$ is covered by the water the steam can reach the plug by the opening $f^2$, and when the muzzle of the gun is elevated and the opening $f^2$ is covered by the water the steam can reach the plug by the opening in the end $f^{10}$ of the said tube. The aforesaid rotary plug P has two passages in it, one of which—viz., $f^{11}$—is vertical, with a lateral opening $f^{12}$ at its lower end, and is open to the atmosphere at its upper end, while the other—viz., $f^{13}$—is a segmental groove or channel which extends horizontally around the plug for about a third of its circumference. Near the upper part of the plug is a handle $f^{14}$, by which the said plug can be turned into the desired position to bring its passages into contiguity to any of the openings $f'\ f^2\ f^3$ of the plug-socket. On the upper end of the plug is a cylindrical prolongation $f^{15}$, which enters a hole in the free extremity of a flexible arm $f^{16}$. This arm is connected at its opposite end to the water-jacket by a screw-pin $f^{17}$ and acts as a spring to keep the plug in its socket. The under surface of the outer end of this flexible arm has a series of cavities or openings $f^{18}$, into one or other of which a pin $f^{19}$ on the plug can enter for the purpose of preventing the plug from being accidentally turned after it has been set into the required position. Lugs or finger-pieces $f^{20}$ are also provided on the said flexible arm to enable it to be raised out of engagement with the said pin $f^{19}$ when it is required to set the plug into a new position.

On reference to Fig. 13 it will be seen that there are five positions (marked 1, 2, 3, 4, and 5) into which the plug can be set, and at Figs. 15 to 19 I have shown horizontal sections illustrating the plug in each of these positions.

When the handle $f^{14}$ is in No. 1 position, Fig. 15, the opening $f^{12}$ coincides with the opening $f^3$, that communicates with the tube $f^9$, and the segmental channel $f^{13}$ then lies opposite the opening $f^2$ without connecting this opening with either of the others. The steam can thus be blown off from the muzzle end of the water-jacket through the pipe $f^9$ and directly through the vertical opening $f^{11}$ in the plug without passing to the valve P'. This position is what I term the "muzzle blow-off." In No. 2 position, Fig. 16, the handle $f^{14}$ has been turned one step to the right, the openings $f^3 f^{12}$ being then closed and the segmental channel $f^{13}$ turned into a position to connect the passages $f' f^2$. The steam can then pass from the rear end of the water-jacket to the valve P'. This I term the "depression" position. In No. 3 position, Fig. 17, the handle has been turned another step to the right and all the openings are disconnected, so that no outlet then exists for the steam. I term this the "closed" position. It is when the plug is in this position that the chief function of the flexible arm $f^{16}$ comes into requisition, for if the pressure within the water-jacket increases to an abnormal extent the said arm no longer exerts sufficient force to keep the plug in its socket, with the result that the plug becomes lifted and permits the steam to escape. The plug while in this position therefore acts as a safety-valve. In No. 4 position, Fig. 18, the handle has been turned another step to the right, thereby causing the segmental channel $f^{13}$ to connect the passages $f' f^3$, while $f^2 f^{12}$ still remain closed. The steam can then escape from the front end of the water-jacket by the tube $f^9$ and reach the valve P' by the passage $f'$. This I term the "elevation" position. In No. 5 position, Fig. 19, the handle has been turned another step to the right, thereby bringing the passage $f^{12}$ opposite the passage $f^2$, while the passages $f'$ and $f^3$ are closed. The steam can then be blown off from the breech end of the water-jacket directly through the vertical opening $f^{11}$ in the plug without passing to the valve P'. This I term the "breech blow-off" position.

I provide words or signs on the surface of the water-jacket for indicating the above-mentioned various positions, and I prefer to form the aforesaid handle $f^{14}$ with a longitudinal opening $f^{21}$, through which these various words or signs appear when the handle is put into a position to cover them. The rear end of the water-jacket is formed with two series of vertically-arranged lugs $F^4 F^4$, and the side plates $a\ a'$ are likewise formed with end lugs $a^{15}$ to fit between these lugs $F^4$. Vertical pins pass through each of these series of lugs and connect the said side plates to the water-jacket. A firm connection between the parts is thus established, so as to prevent any yielding thereof at the instant of firing. Horizontally-arranged lugs $F^5 F^6$ are likewise formed at the upper and lower ends of the rear portion of the water-jacket, and to these lugs the top plate $a^3$ and the bottom plate $a^4$ are respectively connected by hinge-pins. In this manner not only can the top plate be opened upwardly, but the bottom plate can also be turned downwardly, which enables the interior of the casing and the breech mechanism to be examined and reached with the greatest facility.

What I claim is—

1. In an automatic gun, the combination with a non-recoiling barrel, of a jacket surrounding the same and divided by a transverse partition located near the muzzle of the barrel into a water-chamber and a forward gas-chamber of relatively large capacity, a pivoted plate forming one side of said gas-chamber and connections between the plate and the breech mechanism, whereby the movement of the plate due to the pressure of the gases of discharge within the chamber, will operate said breech mechanism, as set forth.

2. In an automatic gun, the combination with a non-recoiling barrel, of a jacket surrounding the same, a transverse partition near the muzzle of the barrel dividing the jacket into a water-chamber and a forward gas-chamber of relatively large capacity, a gland in said partition through which the barrel projects, the barrel being provided with transverse apertures within the chamber for the escape of gas, a pivoted plate forming one side or end of the gas-chamber and connections for transmitting the movement of said plate to the breech mechanism, as set forth.

3. In an automatic gun, the combination with a non-recoiling barrel provided with transverse gas-escape apertures near its muzzle, of a gas-chamber surrounding the said apertures and situated within the mouth of the water-jacket, of a steel casing or lining within the gas-chamber, of a pivoted end plate or flap having an aperture through which the muzzle of the barrel projects, and of means for transmitting the movement of the flap to the breech mechanism of the gun substantially as described.

4. In an automatic gun, the combination with the movable end of the gas-chamber, of a longitudinal bar extending to the breech of the gun and controlled by a spring, of a bell-crank lever operated by the said longitudinal bar and acting on the crank to actuate the breech mechanism, and of a recess formed in the bell-crank lever for the reception of a beveled portion of the crank when the latter is in its horizontal position, the said recess and the beveled portion of the crank thus acting as a "dead-stop" to prevent further movement or rebounding of the crank until the bell-crank lever is again operated by the aforesaid longitudinal bar, substantially as described.

5. In an automatic gun having a non-recoiling barrel, the combination with a crank receiving its motion from mechanism actuated by a portion of the gases of discharge, of a breech block or lock coupled to the crank by a connecting-rod, of a striker carried by the lock and having a notch on its under side, of a vertical opening in the lock-body, of inclined sides to the said opening, one of which terminates at its upper end in a notch, and of a mainspring which engages with the notch on the striker and that on one of the inclined sides of the opening by the mere act of forcing the said mainspring through the opening in the lock-body substantially as described.

6. In an automatic gun having a non-recoiling barrel, the combination with a breech block or lock provided with a reciprocating striker, of an extractor pivoted to the forward portion of the breech block or lock, of a resilient arm connected to the rear portion of the striker and moving therewith, of a slotted opening in the free end of the flexible arm, of a T-head on the extractor for engagement with the said slotted opening, of an ear or lug near the free end of the said resilient arm, of a longitudinal flexible guide situated above the resilient arm and acting to keep it in its depressed position during the greater portion of the movements of the breech block or lock, of a fixed projection or cam-piece situated in proximity to the rearward extremity of the flexible guide and acting to raise the resilient arm and the extractor when the end of said arm leaves the flexible guide, and of a fixed bar or stop which is situated in proximity to the breech end of the barrel, so that after the breech block or lock has closed the breech, the aforesaid slotted end of the resilient arm is, simultaneously with the forward movement of the striker in firing the gun, driven forward beneath the said fixed bar or stop and thereby acts as a wedge to firmly hold the extractor in engagement with the head of the cartridge substantially as described and for the purpose specified.

7. In an automatic gun the combination with a breech block or lock having a reciprocating striker, of spring-controlled safety and firing sears pivotally connected to the lock-body and having shoulders for engagement with a projection on the striker, of a nose or bent end on the safety-sear which comes against the connecting-rod and is thereby lifted to free its shoulder from the projection on the stiker when the said connecting-rod is horizontal and the breech properly closed, of a cam-piece or inclined projection on the firing-sear, and of means for acting on this cam-piece for raising the firing-sear and releasing the striker to fire the gun substantially as described.

8. In an automatic gun, the combination with the firing-sear and the cam-piece or projection thereon, of a spring-controlled sliding bar having a projection to engage with the aforesaid cam-piece on the firing-sear, of a rocking lever connected at its upper end to the said sliding bar and having at its lower end a V-piece and of a V-groove in the end of the rotary firing-button for engagement with the aforesaid V-piece, substantially as described and for the purpose specified.

9. In an automatic gun having a non-recoiling barrel the combination with the breech block or lock, of a feed-wheel mounted on a horizontal spindle which is so situated relatively to the breech end of the barrel that the feed-wheel will by its intermittent movement bring the cartridges in alinement with the cartridge-chamber and the plunger on the lock, of a series of teeth or projections on the feed-wheel, of a spring-controlled pawl for engaging with the said teeth or projections, of a pivoted lever carrying the said pawl, of a shoulder on the pawl which comes between the teeth on the feed-wheel as the pawl rises and thus prevents the feed-wheel from overturning, and of two projections on the crank-shaft for acting on the free end of the aforesaid pivoted lever to alternately raise and lower the pawl, substantially as described.

10. The combination with the spring-controlled pawl for working the feed-wheel, of a sliding bar adapted to engage with the said pawl, of a pivoted lever situated outside the gun and which when shifted in one direction causes the sliding bar to remove the pawl from engagement with the teeth of the feed-wheel and when shifted in the other direction allows the pawl to again come into engagement with said teeth, of a hooked portion or catch on the said pivoted lever for engaging with a projection on the crank-arm when the latter is in its forward position, and of means for keeping the pivoted lever in either of its extreme positions substantially as described and for the purpose specified.

11. In an automatic gun, the combination with the water-jacket having horizontally and vertically arranged lugs at its rear end, of side plates $a$ $a'$ having corresponding lugs for engagement with the said lugs on the water-jacket, of pins passing vertically through these lugs and securing the parts together, and of top and bottom plates $a^2$ $a^3$ having hinge-joints for connection to the aforesaid horizontal lugs on the water-jacket, substantially as described and for the purpose specified.

12. In an automatic gun the combination with the water-jacket of a loose rotary plug having apertures therein, of a socket in which such plug works, of openings in the socket communicating respectively with the breech end of the water-jacket, with a tube leading to the muzzle end of the water-jacket, and with a valve, of means for turning the said plug, and of a flexible arm for locking the said plug in its adjusted positions and for allowing the plug to rise and give passage to the steam if the pressure thereof become abnormally high, substantially as described and for the purpose specified.

In testimony whereof I have hereunto set my hand this 9th day of March, 1896.

HIRAM STEVENS MAXIM.

Witnesses:
PAUL DEVIN,
WILMER M. HARRIS.